June 4, 1968  J. C. STERNBERG  3,386,279
TIME RESOLUTION ANALYSIS APPARATUS
Filed March 1, 1965  3 Sheets-Sheet 1

INVENTOR.
JAMES C. STERNBERG
BY
ATTORNEY

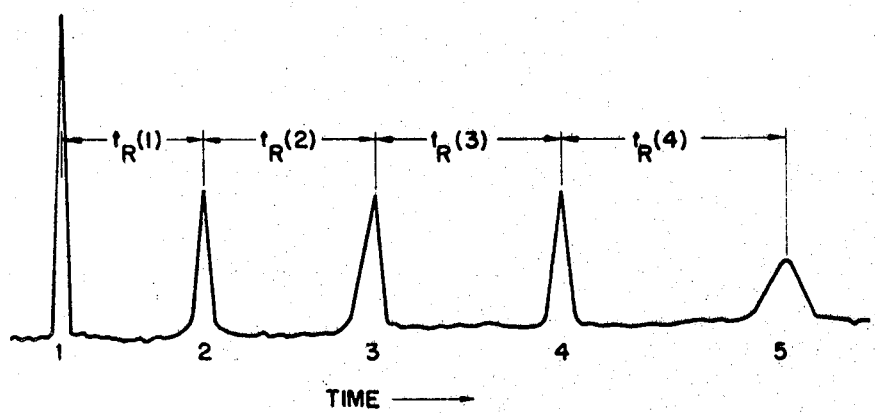
FIG. 4
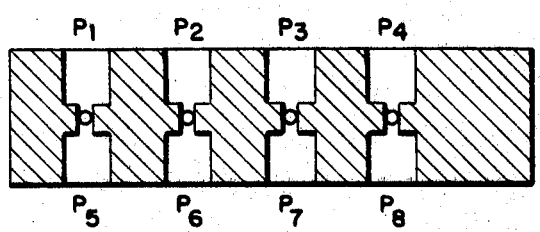
SECTION A-A  FIG. 6
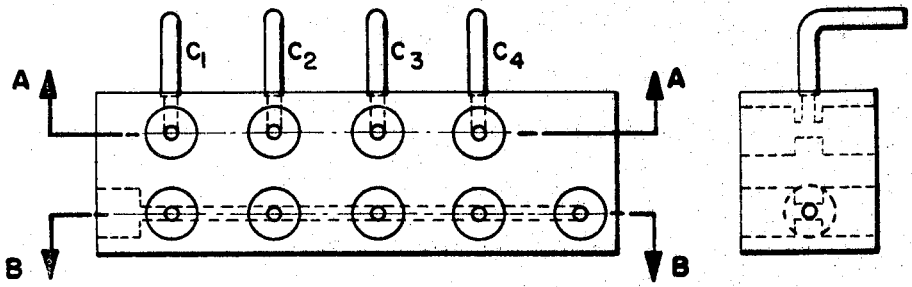
FIG. 5
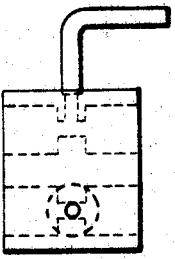
FIG. 7
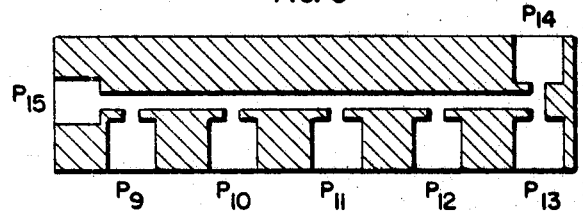
SECTION B-B
FIG. 8

INVENTOR.
JAMES C. STERNBERG
BY
ATTORNEY

United States Patent Office 3,386,279
Patented June 4, 1968

3,386,279
TIME RESOLUTION ANALYSIS APPARATUS
James C. Sternberg, Fullerton, Calif., assignor to Beckman Instruments, Inc., a corporation of California
Filed Mar. 1, 1965, Ser. No. 435,931
9 Claims. (Cl. 73—23.1)

ABSTRACT OF THE DISCLOSURE

Analysis apparatus employing a time resolution principle. A number of chromatographic columns are connected in series to a detector with a restrictor connected from the input of each column to the detector to give timed pulses indicative of the retention on each column of a sample passed in a carrier through the columns. A second embodiment connects delays in series from sample inlet to the detector with selective modifiers such as traps connected from the inputs of the delays to the detector to obtain timed indications of the effect of the modifiers on the sample.

---

This invention relates to apparatus for the qualitative characterization of samples in the field of chromatography and, more particularly, to such apparatus employing a time-related spectrum in its output.

For the identification of substances solely from chromatographic data, it is necessary, except in the simplest cases, to obtain retention data or more than one stationary phase. Methods employing two-column plots, retention volume constants or retention index differences, all rely on data from two different columns and experience has shown that data from more than two is highly desirable.

A problem exists in how best to obtain such data. The obvious approach of maintaining several chromatographs with appropriate columns or of changing columns in a signal chromatograph are wasteful of time and equipment. Various schemes have been advanced by which multi-column retention data can be obtained from a single sample injected into one apparatus. Arrangements in which a sample traverses several columns in series with detectors between them are limited to nondestructive detectors, and require several detectors, as do arrangements in which a sample is split among several parallel columns, each with its own detector.

A simpler approach is found in the work of Franc and Michajlova who employed four columns in parallel, with the combined effluent passing into a common detector. If the sample has a different retention time on each column, the detector will show four distinct peaks. The use of this parallel column technique suffers from a fundamental disadvantage in that the individual peaks cannot be assigned uniquely to elution from a particular column. The data will thus serve as a fingerprint but cannot be used for other purposes. Another disadvantage is that in some cases identical retention times on two of the columns have led to the recording of a single peak. It is, therefore, an object of this invention to provide an apparatus for analyzing a sample pulse which may employ an arrangement of columns or selective modifiers and a single detector and which will be capable of deriving an output signal, separately time-related to each of said columns or selective modifiers, to indicate the effect of the columns or modifiers on the sample.

Another object of this invention is to provide such an analysis apparatus in which a peak may be taken from the output of an analytical chromatograph and injected into said apparatus for identification.

In carrying out the invention in one form thereof, a number of chromatographic columns are connected in series to the input of a detector. A restrictor is connected from the input of each of the columns to the input of the detector and a sample pulse may be injected into the input of the series columns in a carrier stream. The last column may be connected directly to the detector or by way of an additional restrictor. The time between pulses at the detector is indicative of the retention time in each of the columns.

Another form of the invention employs a series of relay lines with an input connected to the input of the detector. Each delay line has associated restrictive characteristics of a series restrictor. Selective modifiers are connected from the inputs of the delay lines to the input of the detector and the output of the last delay line is connected, for example, through a restrictor to the detector, or alternatively, the selective modifiers may be connected from the outputs of the delay lines to the detector and a restrictor connected from the input of the first of the series delay lines to the detector. The modifiers may also have series restrictors. The sample pulse is injected into the input of the series connected delay lines in a stream of carrier.

The novel features which are believed to be characteristic of the invention are set forth with particularity in the appended claims. The invention itself, however, together with further objects and advantages thereof, can best be understood by reference to the following description taken in connection with the accompanying drawings in which:

FIG. 4 is a graph of the output of the apparatus illustrated in FIG. 3 against time;

FIG. 5 is a side view of a manifold such as may be employed in FIG. 4;

FIG. 6 is a section taken along the line A—A of FIG. 5;

FIG. 7 is an end view of the manifold of FIG. 5;

FIG. 8 is a section taken along the line B—B of the manifold of FIG. 5;

Figure 1:
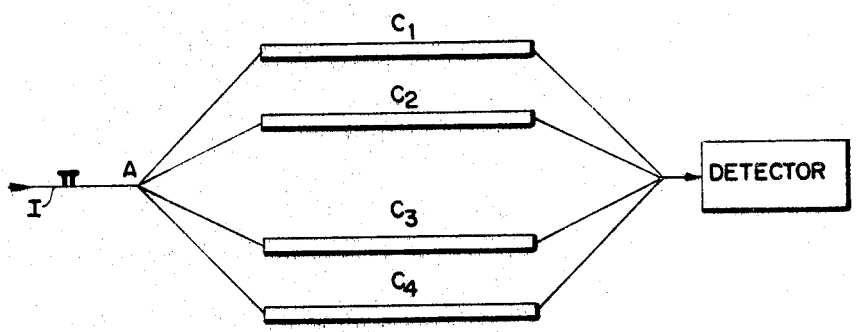
FIG. 1 is a schematic diagram of a prior art parallel column configuration.

Turning now to the drawings, in FIG. 1 the prior art shows an arrangement in which a sample injected at I is split at point A, a portion passing through each of the columns $C_1$–$C_4$ and thence to a common detector. If the sample has a different retention time on each column, the detector will show four distinct peaks. The recorder output from the detector will thus consist of four elution curves from which retention times may be read and used as desired for identification purposes. In addition, the record itself, representing a set of curves characteristic of the sample, may be used as a fingerprint of the unknown to be compared with that of known materials or inspected for features characteristic of various classes of substances. This has led to the application of the term "chromatographic spectrum" or "retention spectra" to such retention records.

Figure 2:
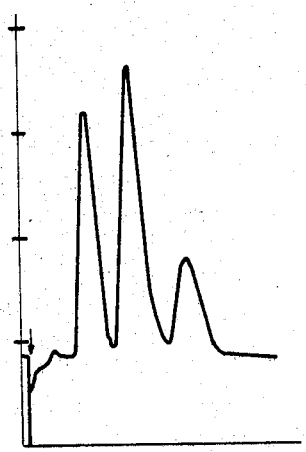
FIG. 2 is a graph of the output of the prior art device of FIG. 1 vs. time.

The output of the arrangement of FIG. 1 is shown in FIG. 2 as peak amplitude vs. time. The first negative going peak is representative of the time of sample injection. The three positive going peaks occur at the retention times of at least three of the columns, the fourth column having either a retention similar to one of the other three or having absorbed the sample. This figure illustrates an analysis of acetone at 55° using the apparatus of FIG. 1.

The use of this parallel column technique suffers from a fundamental disadvantage in that the individual peaks cannot be assigned uniquely to elution from a particular column. The data will thus serve as a fingerprint but cannot be used for other purposes. The disadvantages of the parallel column technique for obtaining retention spectra can be overcome by the use of a time resolution technique employing the subject invention.

Figure 3:
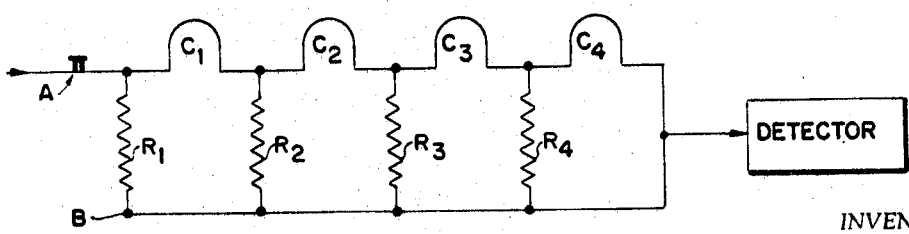
FIG. 3 is a schematic diagram of one embodiment of the invention employing series columns and parallel restrictors.

One embodiment of this technique is illustrated in FIG. 3 in which chromatographic columns $C_1$ to $C_4$ are connected in series to a detector. Restrictors $R_1$ to $R_4$ are connected from the inputs of the columns $C_1$ to $C_4$, respectively, to the input of the detector. In this system, a sample arriving at the input of column $C_1$ is split into two portions, one passing through column $C_1$ and the other through restrictor $R_1$ to the detector. The eluted sample from $C_1$ is split between $C_2$ and $R_2$, etc. If the volumes of the restrictors, which may be capillaries, and connecting lines to the detector are small, the time of transit of samples from each split point to the detector will be very short, and the time at which a recorded peak occurs may be taken as a time at which a sample peak emerges from one column and enters the succeeding column. The time delay is further minimized by sweeping the connecting lines with an auxiliary carrier stream which may be introduced in series with the outputs of restrictors $R_1$ through $R_4$ at point B. The sample to be analyzed may be inserted in a carrier stream at point A. It will be obvious that the carrier stream employed may be either a gas or a liquid and that the technique will be applicable to both types of chromatography.

For N columns, a fraction $$\frac{1}{N+1}$$

of the stream may be drawn off through the first restrictor while $$\frac{N}{N+1}$$

goes through the first column. Another fraction of the remainder $1/N$ is withdrawn through the next restrictor while $$\frac{N-1}{N}$$

goes to the second column. Later splits are then $$\frac{1}{N-1}$$

and $$\frac{N-2}{N-1}$$

followed by $$\frac{1}{N-2}$$

and $$\frac{N-3}{N-2}$$

etc., until the last split is 1:1. This sends equal portions to the detector at each point.

With four columns as shown, five peaks will be recorded and the time between the $N^{th}$ and the $N+1^{th}$ peak will be the retention time on the $N^{th}$ column. This is illustrated in FIG. 4. Note that the time of injection of the sample need not be separately known. The measured detector response to a single sample will thus provide retention data for four columns. It is obvious that an additional restrictor, not shown, may also be inserted between the output of the column $C_4$ and the detector.

In the apparatus of FIG. 3, the columns may be one-quarter inch outside diameter copper tubing and the restrictors .005 inch I.D. stainless steel tubes, attached by a tubing fitting threaded into a stainless steel manifold block which will provide the necessary T-connection and multiport channels. With four coiled six-foot columns, the apparatus is sufficiently compact to fit into the oven compartment of a Beckman GC-2A Chromatograph. Samples may be injected either by syringe injection or by way of a gas sampling valve. The sampling valve may be fed by the effluent of another chromatographic column, as will be discussed subsequently in connection with FIG. 9, which arrangement will allow for the introduction to the retention spectrum apparatus of selected peaks eluted from a chromatogram.

Sample liquid phases which may be used in the columns $C_1$ to $C_4$ are, respectively, a hydrocarbon material of low vapor pressure, such as Apiezon L, obtainable from James G. Biddle Co., Inc., Philadelphia, Pa., silicone grease, a mixture of polyethyleneglycols such as Carbowax 1500, which has an average molecular weight of 1500, obtainable from Union Carbide, New York 17, N.Y., and poly-(diethyleneglycol succinate). For the detector, a thermal conductivity cell and a hydrogen flame ionization detector may be used in series, the former to allow measurements of the unretained component times for each column using air samples.

The manifold which may be used in the apparatus of FIG. 3, is illustrated in FIGS. 5 through 8. It is constructed of stainless steel and has 15 ports, $P_1$ to $P_{15}$, and four ⅛ inch O.D. stainless steel connecting tubes, $C_1$ to $C_4$, heliarced in place. Each of the ports $P_1$ to $P_{15}$ is tapped to receive a male pipe-threaded tubing connector. The four columns of ⅛ inch O.D. copper tubing are connected via appropriate tubing fittings between P1 and C2, P2 and C3, P3 and C4 and P4 and P14 respectively. The 1/16 inch O.D. capillary restrictors are connected across P5 to P9, P6 to P10, P7 to P11 and P8 to P12. The main carrier flow enters through $C_1$ and auxiliary carrier flow through P15. The exit P13 leads to the detector.

Figure 9:
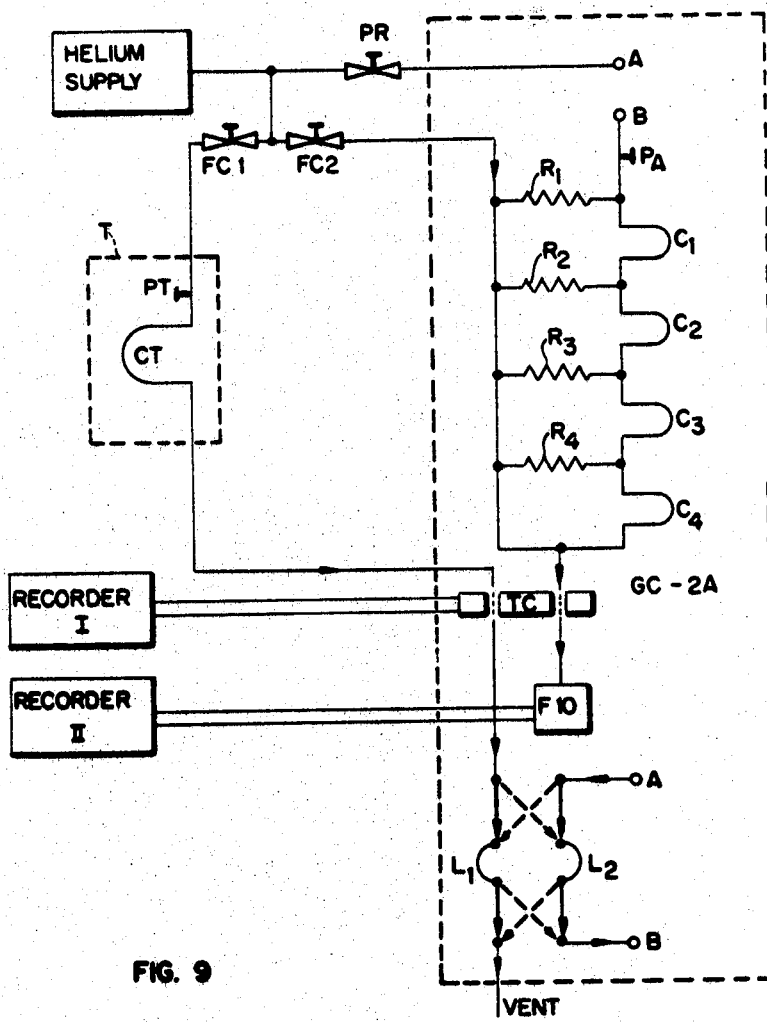
FIG. 9 is a schematic diagram of an apparatus such as is illustrated in FIG. 1, combined with a conventional analytical chromatograph to analyze samples therefrom; and, FIG. 10 is a schematic diagram of another embodiment of the invention employing series connected delay lines and parallel connected selective modifiers.

FIG. 9 illustrates an embodiment in which the effluent from a conventional analytical chromatograph may be analyzed, using apparatus similar to that illustrated in FIG. 3. Carrier gas is supplied via flow controller $FC_1$ to a column $C_T$ which is contained in a temperature programmed gas chromatograph T whose effluent passes through the reference side of the thermal conductivity cell TC and is vented through loop $L_1$ of a gas sampling valve in a Beckman GC-2A Chromatograph. The retention spectrum apparatus, comprising columns $C_1$ through $C_4$ and restrictors $R_1$ through $R_4$, is supplied with primary carrier flow via flow controller $FC_2$. Samples are injected at the injection port $P_T$, and pass through the analytical column $C_T$. Samples are introduced into the retention spectrum apparatus either by direct insertion, as by syringe at port $P_A$, or with the gas sampling valve, by connecting the terminals A and B on the sampling valve to the respective terminals A and B at the input of column $C_1$.

In this embodiment all the columns are ⅛ inch O.D. copper, containing liquid phase on 60 to 80 mesh Chromosorb, a flux-calcined firebrick obtainable from the Johns-Manville Corporation. $C_T$ was a ten-foot column containing 30% silicone grease, $C_1$ a six-foot column containing 30% silicone grease, $C_2$ a six-foot column containing 20% Apiezon L, column $C_3$ a six-foot column containing 30% Carbowax and column $C_4$ a three-foot column containing 20% diethyleglycol succinate polymer.

The restrictors were .005 in I.D. stainless steel tubing as follows:

|    | Feet |
|----|------|
| R1 | 10   |
| R2 | 6    |
| R3 | 3    |
| R4 | 1    |

It was found that the retention times for all but the most volatile samples were inconveniently long at room temperature, even with inlet pressures up to 60 p.s.i.g. A temperature of 65° is found to give convenient retention times and is used for most runs.

To obtain the maximum information from a spectrum, it is desirable that columns with liquid phases of widely different polarities be used. This means that retention volumes on the various columns will vary widely; for hydrocarbons for example, retention volumes on a highly polar column such as Carbowax, will be small compared with those on a nonpolar column such as Apiezon, even though the relative retention volumes on Carbowax differ greatly for various hydrocarbons. The pressure drop across and consequent decrease in flow rate through each column in the series may be used to compensate partially for change in retention volume. Thus, columns which show relatively low retention volumes should be placed at the end of the sequence where flow rates are lower. If a wide variety of sample types is encountered, it is likely that no single sequence will be optimum. The sequence mentioned above was found suitable for hydrocarbons and moderately polar compounds. For materials highly retained in the last column, the retention times were still inconveniently long so the last column was shortened from six feet to three feet.

The relative area obtained for each peak in the spectrum is a function of the magnitude of each of the restrictors used. From a knowledge of the flow impedances of the columns used and the impedance per unit length of the restrictor tubing used, it is possible to compute the length of restrictors required for any specified pattern of peak areas. It would thus be possible, in principle, to achieve a situation of equal areas for each peak for the present system; however, such calculations show that excessive length of the capillary tubing would be required for $R_1$, unless packed small diameter tubing restrictors were employed. The restrictors used were selected to give sufficient sample through the fourth column to produce a readily detectable signal and allow all four eluted peaks to be recorded with, at most, one change in attenuation. Since the initial peak is invariably quite narrow, it is possible to locate the maximum with sufficient accuracy even though the peak is off-scale on an associated recorder.

The apparatus described in FIG. 3 and in more detail in FIG. 9, results in a spectrum at the detector indicative of the retention time in each of the series columns. Thus, in such a system, the time between peaks will vary depending upon the effect of the columns on the sample. It is obvious that a restrictor may be connected from the output of the last series column to the input of the detector if desired.

Figure 10:
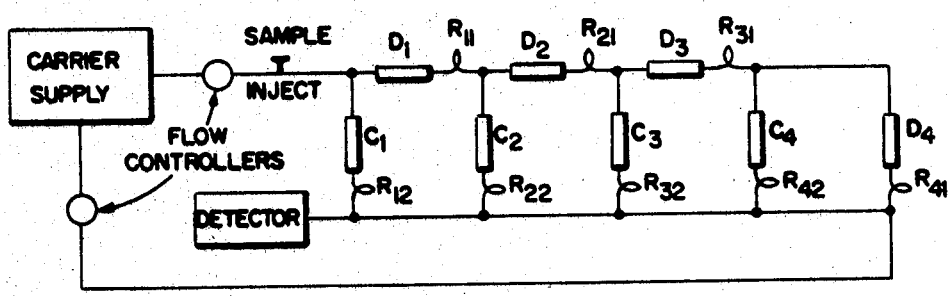

An alternative embodiment of the invention, employing constant times between peaks, is illustrated in FIG. 10. Sample, which may be a particular isolated chromatographic peak of interest, is introduced into a system consisting of a series of restrictors $R_{11}$ to $R_{41}$ and delay lines $D_1$ to $D_4$, with a selective modifier $C_1$ through $C_4$ or selective modifier and series restrictors $R_{12}$ through $R_{42}$ connected from the input of each of the delay lines $D_1$ through $D_4$ to the input of the detector. Sample pulses are divided at the various split points into a stream through the selective modifier and restrictors, such as $C_1$, $R_{12}$, and a stream through the delay line and its restrictors, such as $D_1$, $R_{11}$.

By locating the delay lines and converters upstream of the corresponding restrictors, constant stream splitting ratios are maintained. The streams going through the modifiers then flow to the sensor or detector. It may be desirable to utilize an auxiliary carrier flow in certain cases to carry these streams from the split point through the modifiers, or from the restrictors to the sensor. For this purpose, the carrier supply and flow controllers are connected as illustrated, with the carrier supply and one flow controller in series with the sample inject and the series combination of delay lines, and the carrier supply and the second flow controller in series with the outputs of the selective modifier restrictor series combinations and the input of the detector. It is obvious that the flow controllers can be replaced in any of the above with pressure controllers. The flow may be adjusted so that the sample is divided into equal increments. That portion of sample which is passed through a particular selective modifier will reach the sensor at a characteristic time. From the presence, absence or relative magnitude of response observed at that time, the extent of reaction of the sample in the selective modifier can be inferred. For instance, an olefin sample may simply be selectively trapped and removed by a particular modifier, in which case the absence of a peak at the appropriate time indicates that the sample was an olefin. In other cases, the presence of a response or the degree of response may be used to indicate the presence of a particular functional group within the molecule, or to otherwise characterize the molecule. Variations of the modifiers which may be used are limited only by the ingenuity of the user.

It is evident from the consideration of the apparatus disclosed in FIG. 10 that the basic feature is the establishing by the delay lines of the fixed times at which peaks occur or should occur from each of the selective modifiers. The selective modifiers may be chemical modifiers or absorbers. It is also obvious that the first chemical modifier $C_1$ might be removed and the restrictor $R_{12}$ connected from the input of delay line $D_1$ to the detector. A modifier could then be connected between the outputs of $R_{41}$ and $R_{42}$. In this case, an initial pulse through restrictor $R_{12}$ would indicate that a sequence was about to take place. In the diagram of FIG. 10 as drawn, if the modifier $C_1$ completely absorbs the sample flowing through it, this would have to be accounted for by counting back from the final time at which a pulse was received through $D_4$ and $R_{41}$.

It would also be possible to series-couple an additional sensor, not illustrated, through a suitable delay line to the detector in the circuit of FIG. 10, or to provide separate detectors, not illustrated, at the outputs of the various modifiers. Also, because of the time resolution, a single sensor could be switched so that different entering fractions of the sample enter with different sensor settings, as for example, different wavelength settings on a spectrophotometer monitoring light emission or absorption. In this way, a single sensor can give multiple types of information, as for example, sensing selective emission lines characteristic of such elements as P, S, I, C and N in the far ultraviolet from a gas discharge.

The different forms of modifiers used can give information on functional groups, elemental composition or other structural features of the sample with the output essentially a structure spectrum on a single recorder. Selective characteristics of the sensor or sensors can also be used. Chemical modifiers can be as complex as the combination of an oxidizer with a short chromatographic column, or with other means of measuring $CO_2$, $H_2O$ and $N_2$, and possibly other components formed by oxidation of the sample. Hence, C, H and N ratios could be determined; the required chemical modifier would be located as the final stage so that the time required for the individual component peaks would not need to be matched by appropriate delay lines, or it could be located at any point if suitable delays are provided.

Where quantitative interrelationships between peaks obtained for samples passing through different chemical modifiers are desired, it is possible to pass the required fractions through a common detector prior to their chemical modification so that the modified responses can be ratioed to the amount of sample in the fraction. In this case, it is necessary to add to the system a delay line and valving, not illustrated, to permit sending each fraction from the common detector to its appropriate chemical modifier-detector combination. It is unlikely that more than two or three stages would require such interrelationship on a quantitative basis so that very simple valving may be employed.

While particular embodiments of the invention have been illustrated and particular characteristics disclosed, it will be understood of course, that it is not intended to limit the invention thereto since many modifications may be made. It is therefore contemplated by the appended claims to cover any such modifications as fall within the true spirit of the scope.

What is claimed and desired to be secured by Letters Patent of the United States is:

1. A fluid analysis apparatus for identifying a pulse sample by at least one characteristics comprising:
   at least two series connected chromatographic columns having a series input and output;
   at least two restrictors;
   a detector;
   means connecting a separate one of said restrictors from the input of each of said columns to the input of said detector;
   means connecting said series output to the input of said detector;
   means for flowing said sample in a carrier stream through said columns and restrictors to said detector to derive signals indicative of the retention time of said sample in each of said columns.

2. The combination of claim 1 in which said means for flowing said sample in a carrier stream comprises:
   a source of carrier;
   a flow controller;
   sample injection means; and
   means connecting said source, said flow controller and said sample injection means in series and to said series input.

3. The combination of claim 2 in which said means for flowing said sample in a carrier stream includes:
   a second flow controller; and
   means connecting said source and said second flow controller in series with the outputs of said restrictors to the input of said detector.

4. The apparatus of claim 1 in which said sample is one of the peaks from the output of an analytical chromatograph.

5. A fluid analysis apparatus for identifying a pulse sample by at least one characteristic comprising:
   at least two selective modifiers;
   at least two fluid delay lines, each containing a restrictor, connected in series, having a series input and output;
   a detector;
   means connecting said series output to the input of said detector;
   means connecting a separate one of said selective modifiers from the input of at least all after the first of said delay lines to the input of said detector; and
   means for flowing said sample in a carrier stream through said modifiers and delay lines to said detector to derive a signal which will represent any modification by each of said modifiers at set times established by said delay lines.

6. The combination of claim 5 in which said means for flowing said sample in a carrier stream comprises:
   a source of carrier;
   a flow controller;
   sample injection means; and
   means connecting said source, said flow controller and said sample injection means in series and to said series input.

7. The combination of claim 6 in which said means for flowing said sample in a carrier stream includes:
   a second flow controller; and,
   means connecting said source and said second flow controller in series with the outputs of said modifiers to the input of said detector.

8. The apparatus of claim 5 in which said sample is one of the peaks from the output of an analytical chromatograph.

9. A fluid analysis apparatus for identifying a pulse sample by at least one characteristic comprising:
   at least two selective modifiers, each connected in series with a restrictor;
   at least two fluid delay lines, each connected in series with a restrictor;
   a detector;
   means connecting said series delay line and restrictor combinations in series between an inlet and the input of said detector;
   means connecting a separate one of said selective modifier and restrictor combinations from the input of each of said delay lines to the input of said detector; and,
   means for flowing said sample in a carrier stream through said modifiers and delay lines to said detector to derive a signal which will represent any modification by each of said modifiers at set times established by said delay lines.

References Cited

UNITED STATES PATENTS

| 3,056,277 | 10/1962 | Brenner | 73—23.1 |
| 3,263,488 | 8/1966 | Martin | 73—23.1 |
| 3,318,149 | 5/1967 | Varadi | 73—23.1 |

FOREIGN PATENTS

| 982,497 | 2/1965 | Great Britain. |

OTHER REFERENCES

Merritt, Jr., et al.: Analytical Chemistry, vol. 34, No. 8, July 1962, pp. 908–913.

RICHARD C. QUEISSER, *Primary Examiner.*

C. A. RUEHL, *Assistant Examiner.*